(12) United States Patent
Coldren (10) Patent No.: US 9,234,468 B2
(45) Date of Patent: Jan. 12, 2016

(54) FUEL SYSTEM

(71) Applicant: Caterpillar Inc., Peoria, IL (US)

(72) Inventor: Dana Ray Coldren, Secor, IL (US)

(73) Assignee: Caterpillar Inc., Peoria, IL (US)

( * ) Notice: Subject to any disclaimer, the term of this patent is extended or adjusted under 35 U.S.C. 154(b) by 586 days.

(21) Appl. No.: 13/724,544

(22) Filed: Dec. 21, 2012

(65) Prior Publication Data

US 2014/0174404 A1  Jun. 26, 2014

(51) Int. Cl.
| | |
|---|---|
| *F02D 19/06* | (2006.01) |
| *F01N 3/10* | (2006.01) |
| *F01N 3/36* | (2006.01) |
| *F01N 3/025* | (2006.01) |
| *F01N 3/035* | (2006.01) |
| *F02M 21/02* | (2006.01) |

(52) U.S. Cl.
CPC ............ *F02D 19/0673* (2013.01); *F01N 3/0253* (2013.01); *F01N 3/035* (2013.01); *F01N 3/106* (2013.01); *F01N 3/36* (2013.01); *F02D 19/0605* (2013.01); *F02D 19/0647* (2013.01); *F02M 21/0287* (2013.01); *F01N 2610/03* (2013.01); *F01N 2610/06* (2013.01); *F01N 2610/10* (2013.01); *F01N 2900/1808* (2013.01); *F02D 19/0628* (2013.01); *F02M 21/0224* (2013.01); *Y02T 10/32* (2013.01); *Y02T 10/36* (2013.01)

(58) Field of Classification Search
CPC . F02D 19/06; F02D 19/0605; F02D 19/0607; F02D 19/0615; F02D 19/0623; F02D 19/0626; F02D 19/0628; F02D 19/0631; F02D 19/0642; F02D 19/0647; F02D 19/0673; F02D 19/0678; F01N 3/0253; F01N 3/035; F01N 3/106; F01N 3/36; F01N 2610/03; F01N 2610/06; F01N 2610/10; F01N 2900/1808; F02M 21/0287; F02M 21/0224; Y02T 10/32; Y02T 10/36
USPC .......................................................... 123/459
See application file for complete search history.

(56) References Cited

U.S. PATENT DOCUMENTS

| | | | | |
|---|---|---|---|---|
| 5,522,369 | A | * | 6/1996 | Povinger ................. F02B 43/00 123/447 |
| 5,868,121 | A | * | 2/1999 | Brown ................... F02D 19/027 123/525 |
| 6,298,833 | B1 | | 10/2001 | Douville et al. |
| 6,862,881 | B1 | | 3/2005 | Klingbeil et al. |
| 6,969,562 | B2 | | 11/2005 | Su et al. |
| 7,110,730 | B2 | | 9/2006 | Okada et al. |
| 7,110,904 | B2 | | 9/2006 | Lippa et al. |
| 8,028,676 | B2 | | 10/2011 | Ancimer et al. |

(Continued)

FOREIGN PATENT DOCUMENTS

DE   102010026151 A1 * 1/2012 .......... F02D 19/0613

*Primary Examiner* — Hai Huynh
*Assistant Examiner* — Raza Najmuddin
(74) *Attorney, Agent, or Firm* — Finnegan, Henderson, Farabow, Garrett & Dunner, LLP (57) ABSTRACT

A fuel system for a dual fuel power source includes a first fuel circuit fluidly connected to the power source, a second fuel circuit separate from the first fuel circuit and fluidly connected to the power source, and a pressure regulator fluidly connected to the first fuel circuit. The pressure regulator is configured to vent a first fuel from the first fuel circuit to an aftertreatment system fluidly connected to the power source in response to a pressure difference between the first and second fuel circuits being less than or equal to a pressure difference threshold.

20 Claims, 2 Drawing Sheets

(56) References Cited

U.S. PATENT DOCUMENTS

| | | |
|---|---|---|
| 2008/0053349 A1 | 3/2008 | O'Connor et al. |
| 2008/0262701 A1 | 10/2008 | Williams et al. |
| 2010/0116652 A1 | 5/2010 | Wiemers |
| 2012/0222400 A1* | 9/2012 | Walker ............... F01N 3/36 60/274 |
| 2015/0068506 A1* | 3/2015 | Gokhale ............ F02D 19/0628 123/679 |

* cited by examiner

FUEL SYSTEM

TECHNICAL FIELD

The present disclosure relates generally to a fuel system, and more particularly, to a fuel system for use with a dual fuel power source.

BACKGROUND

Dual fuel engines are well known in the art and combust a mixture of two different types of fuel. For example, a particular dual fuel engine can combust a mixture of a liquid fuel (e.g., diesel fuel) and a gaseous fuel (e.g., natural gas). By combusting two different types of fuel, advantages of both fuels (e.g., efficiency, power, emissions, cost, etc.) can be realized.

In order to properly control performance of a dual fuel engine, the pressures and/or flow rates of the two different fuels into the engine should be tightly regulated. Historically, the pressures and/or flow rates of the fuels have been regulated independently, for example by way of a variable displacement liquid fuel pump and by way of a gas vent. The variable displacement liquid fuel pump, however, may be too expensive and/or complex for some applications. In addition, venting of the gaseous fuel may be undesirable due to the harm such gaseous fuel may cause to the environment and because such venting may be wasteful. Finally, it may be desirable to link the pressures and/or flow rates of the two fuels in some operations, such that desired ratios of the fuels may be provided.

One way to control the pressures and flows of a dual fuel system is described in U.S. Pat. No. 6,298,833 issued to Douville et al. on Oct. 9, 2001 (the '833 patent). In particular, the '833 patent describes a system for delivering diesel fuel and gaseous fuel through an injector into an engine. The system employs a pressure balancing device having a first chamber in fluid communication with a supply of the diesel fuel and with the injector, a second chamber isolated from the first chamber and in fluid communication with a supply of the gaseous fuel and the injector, and a piston separating the first and second chambers. The piston is movable to maintain a pressure of the diesel fuel a fixed amount higher than a pressure of the gaseous fuel. In addition, a position of the piston is sensed and used to control a diesel fuel pump, thereby maintaining the pressures of both the diesel fuel and the gaseous fuel within a desired range.

While the system of the '833 patent may adequately control diesel and gaseous fuel pressures for some applications, it may still be less than optimal. In particular, the system may not allow for independent control of diesel and gaseous fuel pressures. Additionally, in order to maintain the pressure of the gaseous fuel below that of the diesel fuel, the system of the '833 patent may vent natural gas to atmosphere in certain operating conditions. These deficiencies may reduce the overall efficiency of the system, and may be harmful to the environment.

The exemplary embodiments of the present disclosure are directed to overcoming one or more of the problems set forth above and/or other problems of the prior art.

SUMMARY

In an exemplary embodiment of the present disclosure, a fuel system for a dual fuel power source includes a first fuel circuit fluidly connected to the power source, a second fuel circuit separate from the first fuel circuit and fluidly connected to the power source, and a pressure regulator fluidly connected to the first fuel circuit. The pressure regulator is configured to vent a first fuel from the first fuel circuit to an aftertreatment system fluidly connected to the power source in response to a pressure difference between the first and second fuel circuits being less than or equal to a pressure difference threshold.

In another exemplary embodiment of the present disclosure, a fuel system for a dual fuel power source includes a first fuel circuit configured to supply a first fuel to a pressure regulator fluidly connected to the power source. The fuel system also includes a second fuel circuit separate from the first fuel circuit. The second fuel circuit is configured to supply a second fuel, different than the first fuel, to the pressure regulator. The fuel system further includes an injector fluidly connected to the pressure regulator. The injector is configured to inject the first and second fuels into a combustion chamber of the power source. The pressure regulator is fluidly connected to an accumulator and configured to vent the first fuel, in gaseous form, to the accumulator in response to a pressure difference between the first and second fuel circuits being less than or equal to a pressure difference threshold.

In a further exemplary embodiment of the present disclosure, a method of operating a fuel system associated with a dual fuel power source includes directing a first fuel, in gaseous form, from a first fuel circuit to the power source. The method also includes directing a second fuel, different than the first fuel, from a second fuel circuit to the power source for combustion with the first fuel. The method further includes directing combustion exhaust from the power source through a particulate filter of an aftertreatment system fluidly connected to the power source. The method also includes venting the first fuel from the first fuel circuit to the aftertreatment system in response to a pressure difference between the first and second fuel circuits being less than or equal to a pressure difference threshold. The method further includes combusting the vented first fuel in a regeneration device of the aftertreatment system to actively regenerate the particulate filter.

DETAILED DESCRIPTION

Figure 1:
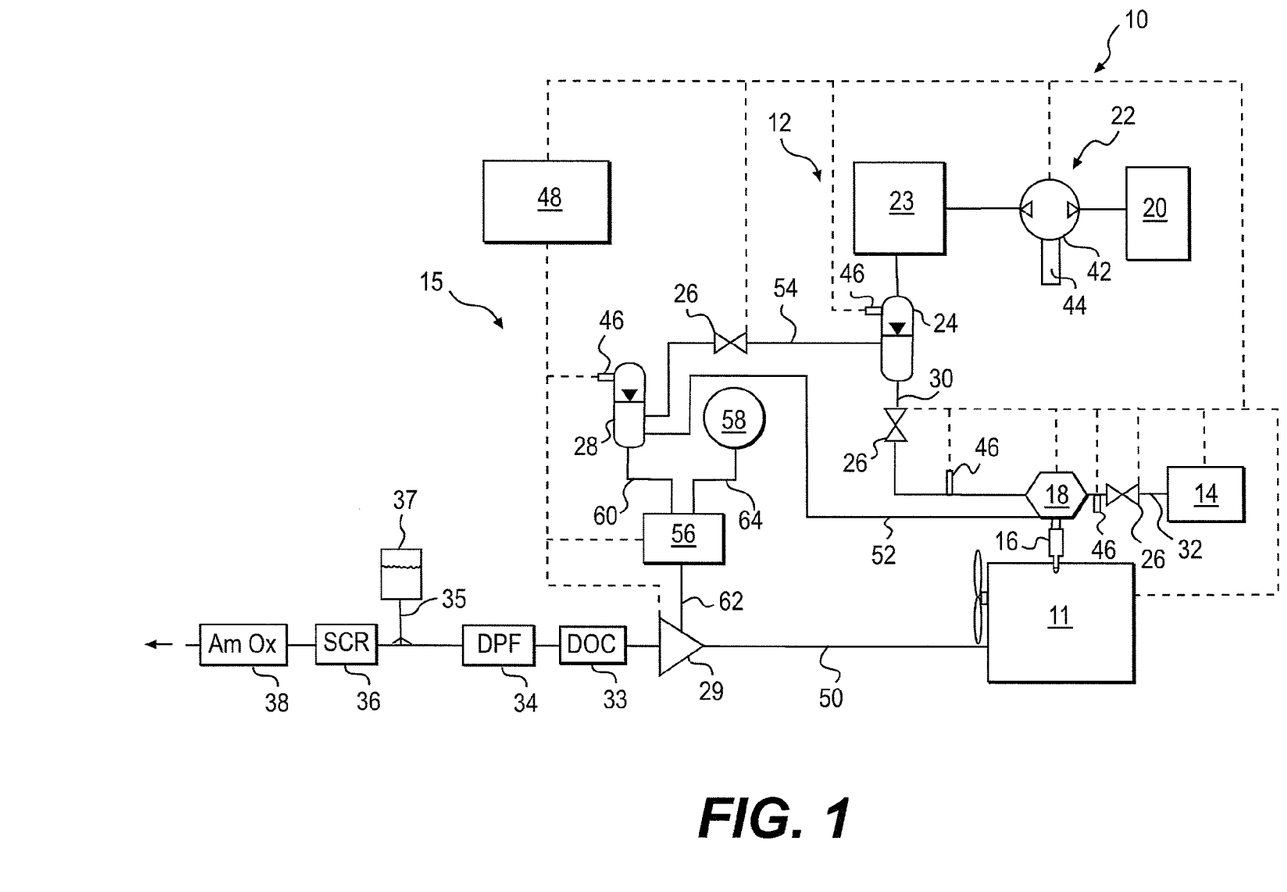
FIG. 1 is a pictorial illustration of an exemplary disclosed fuel system and dual fuel regulator.

FIG. 1 illustrates an exemplary fuel system 10 for use with a dual fuel power source 11. In exemplary embodiments, power source 11 may comprise a combustion engine such as, for example, a gaseous and liquid fuel-powered internal combustion engine. In the disclosed exemplary embodiment, fuel system 10 provides natural gas and diesel to power source 11. It should be noted, however, that other gaseous and/or liquid fuels may be supplied by fuel system 10 to power source 11. Fuel system 10 may include, among other things, a gaseous fuel supply circuit (GFSC) 12, a liquid fuel supply circuit (LFSC) 14, an injector 16 configured to receive natural gas only, diesel only, or both natural gas and diesel for injection into power source 11, and a pressure regulator 18 fluidly connected to injector 16, GFSC 12, and LFSC 14.

GFSC 12 may include components that cooperate to deliver natural gas from a supply 20 to pressure regulator 18. These components may include, for example, a pump 22, a heat exchanger 23, a high-pressure accumulator 24, and one or more metering valves 26. Pump 22 may be connected to supply 20 by way of a passage 30, and to high-pressure accumulator 24 by way of passage 30. Metering valve 26 may be fluidly connected to passage 30 between high-pressure accumulator 24 and pressure regulator 18. Alternatively and/or additionally, one or more metering valves 26 may be fluidly connected to passage 30 upstream of high-pressure accumulator 24, such as between high-pressure accumulator 24 and heat exchanger 23. Pump 22 may be configured to draw natural gas (or otherwise receive natural gas) from supply 20 via passage 30, and push the natural gas through passage 30 into high-pressure accumulator 24 via heat exchanger 23. The natural gas may then flow through passage 30 and metering valve 26 at a rate and/or with a pressure affected by an adjustable restriction of metering valve 26. From metering valve 26, the natural gas may be directed to pressure regulator 18 via passage 30 and into injector 16. Passage 30 may comprise a high-pressure fluid line, pipe, channel, and/or other like structure configured to transmit fluid, and in exemplary embodiments, passage 30 may comprise individual segments fluidly connected to one or more of supply 20, pump 22, heat exchanger 23, high-pressure accumulator 24, metering valve 26, and/or pressure regulator 18.

Supply 20 may embody a cryogenic tank configured to hold the natural gas in a liquefied state. In the exemplary embodiment, supply 20 is an insulated tank that maintains a temperature of the natural gas at or near a boiling temperature of about −165° C. It is contemplated that supply 20 may be provided with conventional equipment for handling liquefied natural gas (LNG), for example chillers, heaters, circulators, ventilators, etc., as desired.

Pump 22 may be any type of pump known in the art for handling natural gas in its liquid state (LNG) and/or gaseous state. In particular, at any point between supply 20 and high-pressure accumulator 24 (e.g., upstream and/or downstream of pump 22), the LNG may change phase from liquid to gas. In exemplary embodiments, such a phase change may occur, for example, at heat exchanger 23 where a temperature of the LNG may be increased. In further exemplary embodiments, the LNG may change phase anywhere downstream of pump 22, and pump 22 may be configured to handle only LNG.

Pump 22 may comprise any fixed displacement pumping device known in the art. Such fixed displacement pumping devices may include, for example, a piston type, diaphragm type, or centrifugal type pump. Pump 22 may be powered by a variable speed drive 44. In exemplary embodiments, such a drive 44 may comprise, among other things, a hydraulic pump (not shown) driven by power source 11 and connected to a hydraulic motor (not shown) in closed-loop fashion. Drive 44 may be mechanically and/or otherwise connected to a pumping device 42, and in exemplary embodiments, although the displacement of pumping device 42 is fixed, the output of pump 22 may still be varied by adjusting the speed of drive 44. The speed of drive 44 may be adjusted by changing an input speed of, for example, the hydraulic pump described above and/or by changing a displacement of the hydraulic pump or the hydraulic motor. It is contemplated that other types of pumps may alternatively be utilized to push natural gas through GFSC 12, if desired, for example a variable displacement pump.

Heat exchanger 23 may be disposed in passage 30 between pump 22 and high-pressure accumulator 24. Heat exchanger 23 may embody a radiator, hydraulic fluid cooler, and/or other like component configured to change a temperature of a fluid flowing therethrough via conductive and/or convective heat transfer. Heat exchanger 23 may be configured to dissipate heat from, for example, hydraulic fluid used to perform activities associated with a machine to which fuel system 10 is connected. Heat exchanger 23 may also be configured to dissipate heat from, for example, coolant used to cool components of power source 11. In exemplary embodiments, heat from such hydraulic fluid and/or coolant may be conductively and/or convectively transferred to natural gas passing through heat exchanger 23 from pump 22. For example, such heated hydraulic fluid and/or coolant may pass through fluid channels of heat exchanger 23 while liquid natural gas may pass through separate adjacent fluid channels of heat exchanger 23. In this way, the natural gas directed to heat exchanger 23 may absorb heat from such heated fluids during operation of power source 11, and the temperature of the liquid natural gas passing through heat exchanger 23 may increase. In exemplary embodiments, such a temperature increase may facilitate a change in phase of the natural gas from liquid to gaseous form at heat exchanger 23. Although heat exchanger 23 has been described as a liquid-to-liquid type of exchanger, in other exemplary embodiments, heat exchanger 23 may comprise a liquid-to-air type of exchanger and/or any other type of known heat exchanger.

High-pressure accumulator 24 may embody a pressure vessel configured to store pressurized natural gas for future use by injector 16. Pressurized natural gas may be directed into high-pressure accumulator 24 by pump 22 via heat exchanger 23 and passage 30. Because the natural gas therein is compressible, it may act like a spring and compress as more natural gas flows into high-pressure accumulator 24. When the pressure of the natural gas within passage 30 downstream of high-pressure accumulator 24 drops below the pressure of high-pressure accumulator 24 the compressed natural gas may expand and exit high-pressure accumulator 24. It is contemplated that high-pressure accumulator 24 may alternatively embody a membrane/spring-biased or bladder-type accumulator, if desired.

In the disclosed embodiment, high-pressure accumulator 24 may be configured to store compressed natural gas at relatively high pressures. For example, high-pressure accumulator 24 may be configured to accumulate natural gas having a pressure in the range of about 15-40 MPa. It is contemplated, however, that other pressures may alternatively be accommodated by high-pressure accumulator 24 if desired. It is also contemplated that high-pressure accumulator 24 may have any desired volume configured to accommodate sufficient compressed natural gas required for daily operation of power source 11. During operation of GFSC 12, the pressure within high-pressure accumulator 24 may be monitored and/or regulated. For example, one or more pressure sensors 46 may be associated with high-pressure accumulator 24 and configured to generate signals indicative of the pressure thereof. The signals from pressure sensors 46 may be directed to a controller 48 for further processing. As illustrated in FIG. 1, such sensors 46 may also be associated with one or more additional components of GFSC 12 and/or with passage 30.

Metering valve 26 may embody an electronically controlled valve element that is movable to any position between an open flow-passing position and a closed flow-blocking position. A valve element of metering valve 26 may be moved between the flow-passing and flow-blocking positions in response to a command signal from controller 48. For example, the flow of natural gas through metering valve 26 may be controllably increased and/or decreased based on a given consumption rate of natural gas by power source 11.

LFSC 14 may include components that cooperate to deliver diesel to pressure regulator 18 and/or to injector 16, and such components may be similar to those described above with respect to GFSC 12. For example, although not illustrated in FIG. 1, LFSC 14 may include a fuel supply fluidly connected to a pump via a passage 32. Passage 32 may extend from, for example, the supply of LFSC 14 to pressure regulator 18. LFSC 14 may also include an accumulator fluidly connected downstream of the pump via passage 32, and such components of LFSC 14 may be fluidly connected to pressure regulator 18 via passage 32 and one or more metering valves 26.

The pump of LFSC 14 may be configured to draw diesel (or otherwise receive diesel) from the supply of LFSC 14 via passage 32, and push the diesel through passage 32 into the accumulator of LFSC 14. The diesel may exit the accumulator as allowed by metering valve 26 shown in passage 32 at a rate and/or with a pressure affected by a restriction of metering valve 26. Such diesel may then be directed to pressure regulator 18 and injector 16 via passage 32. In some applications, a fixed or variable restriction (not shown) may be placed within passage 32 to allow monitoring of a flow of diesel fuel. Alternatively, and/or in addition, pressure within passage 32 may be monitored using a pressure sensor 46. This information may be useful in limiting an amount of excess pumping, while ensuring adequate diesel fuel delivery to regulator 18 in order to maintain desired pressure control. The information may also be used to monitory diesel fuel delivery and identify fault conditions.

The supply, pump, and accumulator of LFSC 14 may be substantially similar to supply 20, pump 22, and high-pressure accumulator 24 described above with respect to GFSC 12. Accordingly, the configurations of these components will not be described in great detail herein. Instead, it is understood that the supply of LFSC 14 may embody a conventional tank configured to hold diesel. It is contemplated that such a supply may be provided with conventional equipment for handling diesel, for example filters, separators, circulators, ventilators, etc., as desired.

The pump of LFSC 14 may be configured to receive diesel from such a supply and/or from a low-pressure feed pump (not shown) fluidly connected to the supply, and increase the pressure of the diesel to, in some embodiments, about 100 MPa. In exemplary embodiments, the pump of LFSC 14 may be a fixed-displacement, piston-type pump. It is contemplated, however, that the pump of LFSC 14 may alternatively be any other type of pump known in the art, for example a fixed- or variable-displacement piston-pump, centrifugal pump, or another type of pump that is electrically and/or mechanically driven by the power source 11 described above with respect to pump 22.

The accumulator of LFSC 14 may embody a pressure vessel filled with a compressible gas that is configured to store pressurized diesel for future use by injector 16. The compressible gas may include, for example, nitrogen, argon, helium, or another appropriate compressible gas. As diesel in passage 32 exceeds a pressure of the LFSC accumulator, the diesel may flow into the accumulator. Because the gas therein is compressible, it may act like a spring and compress as the diesel flows into the accumulator. When the pressure of the diesel within passage 32 drops below the pressure of the accumulator, the compressed gas may expand and urge the diesel from within the accumulator of LFSC 14 to exit. In general, a pressure of diesel within the accumulator of LFSC 14 may be maintained higher than a pressure of natural gas within, for example, high-pressure accumulator 24. For example, the diesel pressure may be maintained about 5 MPa higher than the natural gas pressure during normal operation (e.g., within a range of about 20-40 MPa). And during additional modes of operation, the diesel pressure may be raised to about 80-100 MPa within the accumulator of LFSC 14. It is contemplated that the accumulator of LFSC 14 may alternatively simply be a tank or another type of accumulator such as a membrane/spring or bladder type of accumulator, if desired.

During operation of LFSC 14, the pressures of such an accumulator may be monitored. For example, one or more pressure sensors 46 may be associated with the accumulator of LFSC 14. As shown in FIG. 1, at least one additional pressure sensor 46 may be fluidly connected to passage 32 between metering valve 26 and pressure regulator 18. In still further embodiments, such a pressure sensor 46 may be fluidly connected to passage 32 upstream of metering valve 26, such as between metering valve 26 and the accumulator of LFSC 14. As described above, such pressure sensors 46 may be configured to generate signals indicative of the pressures of components of LFSC 14. The signals from pressure sensors 46 may be directed to controller 48 for further processing.

Pressure regulator 18 may comprise an assembly of components that function together to regulate pressures within fuel system 10. In particular, pressure regulator 18 may be configured to regulate a pressure difference between GFSC 12 and LFSC 14, and to maintain the pressure difference within a desired range. In exemplary embodiments, pressure regulator 18 may be configured to maintain the pressure difference between GFSC 12 and LFSC 14 below a desired pressure difference threshold.

Although not illustrated in FIG. 1, in exemplary embodiments, pressure regulator 18 may include, among other things, a body having a primary cavity, a secondary cavity, and/or a tertiary cavity formed therein. The primary cavity may be configured to selectively pass a flow of natural gas from a first inlet port of pressure regulator 18 fluidly connected to passage 30 to a first outlet port fluidly connected to injector 16. The secondary cavity may be configured to selectively pass a flow of diesel from a second inlet port of pressure regulator 18 fluidly connected to passage 32 to a second outlet port fluidly connected to injector 16. In such embodiments, the primary cavity may be substantially fluidly separate from the secondary cavity. The tertiary cavity of pressure regulator 18 may be selectively fluidly connected to the primary cavity. For example, the tertiary cavity may be configured to selectively pass a flow of natural gas from the primary cavity to a third outlet port of pressure regulator 18 fluidly separate from the first and second outlet ports.

One or more controllable valve elements (not shown) may be disposed within the primary, secondary, and/or tertiary cavities, respectively, and such valve elements may be configured to regulate flow entering and/or exiting the respective cavities. For example, such valve elements may comprise variable flow control valves configured to separately regulate the pressure and/or flow rate of the respective fluids (e.g., liquid diesel fuel and gaseous natural gas) passing through pressure regulator 18. In exemplary embodiments, a valve element fluidly connected to the tertiary cavity may be configured to vent pressurized natural gas from the primary cavity to the tertiary cavity in response to commands received from controller 48. In such embodiments, controller 48 may command the valve element fluidly connected to the tertiary cavity to vent pressurized natural gas from the primary cavity to the tertiary cavity in response to signals received from one or more pressure sensors 46 indicative of for example, a pressure difference between GFSC 12 and LFSC 14 being less than or equal to a pressure difference threshold. In alternative exemplary embodiments, the metering valve 26 of GFSC 12 and/or additional valve elements connected to passage 30 may be configured to vent pressurized natural gas from GFSC 12 in response to signals received from controller 18. For example, controller 18 may direct such signals to metering valve 26 in response to determining that the pressure difference between GFSC 12 and LFSC 14 is less than or equal to the pressure difference threshold. In such alternative exemplary embodiments, the tertiary cavity of pressure regulator 18 may be omitted.

Injector 16 may receive natural gas from GFSC 12 and diesel from LFSC 14, and may be configured to controllably direct one or both fuels to components of power source 11 in response to one or more signals received from controller 48. In exemplary embodiments, injector 16 may be configured to direct both gaseous natural gas and liquid diesel to one or more combustion chambers (not shown) of power source 11 for combustion therein. Injector 16 may be configured for use in high-pressure direct injection applications in which pressurized natural gas is directed to the power source 11 for combustion. It is understood that in such high-pressure direct injection applications, injector 16 may direct natural gas any desired range of pressures, and in an exemplary embodiment, such pressures may be between approximately 15 MPa and approximately 40 MPa. In such applications, injector 16 may be configured to direct pressurized natural gas and diesel to a combustion chamber of power source 11 substantially simultaneously. Alternatively, in such applications, injector 16 may be configured to direct diesel to the combustion chamber prior to directing pressurized natural gas thereto. Injector 16 may include one or more valve elements, restrictions, passages, and/or other like flow control components to assist in controlling the timing, pressure, flow rate, quantity, and/or other parameters associated with the injection of pressurized natural gas and diesel to the combustion chamber. Alternatively, and/or in addition, one or more such parameters may be controlled by pressure regulator 18.

As shown in FIG. 1, power source 11, GFSC 12, and/or LFSC 14 may be fluidly and/or otherwise connected to an aftertreatment system 15. The aftertreatment system 15 may include multiple components that condition and direct exhaust from power source 11 to the atmosphere. For example, aftertreatment system 15 may include an exhaust passage 50 fluidly connected to power source 11 and configured to receive exhaust therefrom. Aftertreatment system 15 may also include a vent passage 52 fluidly connected to pressure regulator 18 and/or one or more other components of GFSC 12, and configured to direct, for example, vented fuel in liquid or gaseous form from GFSC 12 to a low-pressure accumulator 28 of aftertreatment system 15. In exemplary embodiments, vent passage 52 may be fluidly connected to the third outlet port of pressure regulator 18 associated with the tertiary cavity described above. Alternatively, in embodiments in which the tertiary cavity has been omitted, vent passage 52 may be fluidly connected to the metering valve 26 of GFSC 12 and/or additional valve elements fluidly connected to passage 30 and configured to vent pressurized natural gas from GFSC 12. Aftertreatment system 15 may further include an accumulator passage 54 fluidly connecting high-pressure accumulator 24 with low-pressure accumulator 28.

In order to assist in conditioning exhaust received from power source 11, aftertreatment system 15 may include one or more exhaust treatment devices fluidly connected to exhaust passage 50. Such exhaust treatment devices may include a diesel oxidation catalyst ("DOC") 33, a diesel particulate filter ("DPF") 34, a selective catalytic reduction ("SCR") device 36, and an ammonia oxidation ("AMOX") device 38. It is contemplated that aftertreatment system 15 may include different or additional components than described above such as, for example, bypass components, an exhaust compression or restriction brake, an attenuation device, additional exhaust treatment devices, and other known components, if desired.

As exhaust flows through the exhaust treatment devices disposed in exhaust passage 50, hydrocarbons, oxides of nitrogen ("$NO_X$"), and/or oxides of sulfur ("$SO_X$") in the exhaust may chemically bond to catalyzed surfaces of one or more substrates disposed within the respective exhaust treatment devices. These exhaust constituents may undergo a catalytic reaction at such substrates, and the resulting products may leave the catalyzed surfaces along with the exhaust. One or more of the exhaust treatment devices may include a substrate having, for example, a porous ceramic honeycomb structure or otherwise porous structure such as a mesh and/or filter element to maximize the available surface area. Such exemplary substrates may be constructed of any material useful in removing pollutants and/or particulates from the exhaust stream, such as, for example, foam cordierite, sintered metal, ceramic, or silicon carbide. Other materials that may be used for the substrate include alumina, zeolite, aluminophosphates, and hexyluminates. Combinations of these materials may be used, and such materials may be chosen based on engine diagnostic and/or exhaust diagnostic parameters, and/or for conformity with environmental standards. Such substrates may be situated horizontally, vertically, radially, or helically. It is contemplated that such substrates may include any known catalyst material capable of reacting with hydrocarbons, $NO_X$, $SO_X$, particulate matter, and/or other exhaust constituents. The catalyst material may be coated on, impregnated within, or otherwise associated with the substrate to promote oxidation or reduction of some constituents of the exhaust. Such catalyst materials may include, for example, aluminum, platinum, palladium, rhodium, barium, cerium, and/or alkali metals, alkaline-earth metals, rare-earth metals, or combinations thereof.

DOC 33 may include a flow-through substrate (not shown) having, for example, a porous ceramic honeycomb structure or metal mesh configuration with numerous parallel channels for the exhaust to flow through. A catalytic coating may be applied to the surface of the DOC substrate to promote oxidation of some constituents of the exhaust as it flows therethrough. The honeycomb structure of the DOC substrate may increase the contact area of the substrate available to the exhaust and therefore may allow more of the undesirable constituents in the exhaust to be oxidized. It is understood that during the oxidation process, oxygen may react with and/or bond to such constituents to produce less harmful compounds.

DPF 34 is a device used to physically separate soot or particulate matter from the exhaust. DPF 34 may include a wall flow substrate (not shown) or other porous structure known in the art, and the DPF substrate may contain a catalyst. It is contemplated that the DPF substrate may include an electrically conductive or non-conductive metal mesh or porous ceramic honeycomb medium. The exhaust may pass through the walls of the DPF substrate leaving the larger particulate matter accumulated on the substrate walls. As is known in the art, DPF 34 may be regenerated periodically to clear and/or burn the particulate matter accumulated in such a substrate. The collected particulate matter may be passively regenerated and/or actively regenerated. When passively regenerated, the particulates deposited on the DPF substrate may chemically react with the catalyst material, for example, a base metal oxide, a molten salt, and/or a precious metal that is coated on or otherwise included within the DPF substrate, to lower the ignition temperature of the particulates. The temperatures of the exhaust flow entering DPF 34 may be high enough, in combination with the catalyst, to burn away the trapped particulates.

In active regeneration, on the other hand, a regeneration device 29, for example, a fuel-fired burner, an electric heater, or any other device known in the art, may be located upstream of DPF 34 to apply heat to the exhaust in order to elevate the temperature of the particulates to an ignition threshold. Regeneration device 29 may be located at any position in exhaust passage 50 between power source 11 and DPF 34 in order to elevate the temperature of exhaust passing to DPF 34. Although FIG. 1 illustrates regeneration device 29 being disposed between power source 11 and DOC 33, in further exemplary embodiments, regeneration device 29 may be disposed between DOC 33 and DPF 34 to facilitate active regeneration of DPF 34.

SCR device 36 and AMOX device 38 may include one or more respective catalyzed substrates (not shown) that convert $NO_X$ in the exhaust into relatively benign components, such as, nitrogen gas and water. A gaseous or liquid reagent (such as, for example, urea, ammonia gas, liquefied anhydrous ammonia, ammonium carbonate, or an ammine salt such as AdBlue®, etc.) may be injected into the exhaust by a reagent injector 35 to enable the reduction reaction in SCR device 36. The reagent injector 35 may be fluidly connected to a reagent supply 37, one or more control valves, filters, pumps, and/or any other like fluid control components configured to assist in injecting reagent into the exhaust upstream of SCR device 36. In exemplary embodiments, reagent injector 35 and/or any other such components may be fluidly connected to exhaust passage 50 between DPF 34 and SCR device 36. The injected reagent may decompose into ammonia ("$NH_3$"), which reacts with $NO_X$ in the exhaust to form water ("$H_2O$") and elemental nitrogen ("$N_2$") on the catalyzed substrate of SCR device 36. It is contemplated that the substrate of SCR device 36 may be placed far enough downstream of reagent injector 35 in order for the reagent to have sufficient time to decompose into the $NH_3$ required for the reduction of $NO_X$, and to evenly distribute throughout the substrate. It is contemplated that the catalyst material on the substrate of SCR device 36 may be different from the catalyst material in the upstream devices 33 and 34 to accommodate downstream conditions that are different from upstream conditions such as exhaust temperatures, if desired. For example, the substrate of SCR device 36 may be coated with a catalyst having a lower activation temperature than that applied to the substrates of the upstream devices 33 and 34. In one embodiment, the catalyst coating on the substrate of SCR device 36 may be copper zeolite.

During operation of SCR device 36 and/or reagent injector 35, it may be possible for too much reagent to be advanced into the exhaust passage 50 (i.e., $NH_3$ in excess of that required for appropriate $NO_X$ reduction). In this situation, some amount of $NH_3$ (known as "$NH_3$ slip") may pass into the atmosphere, if not otherwise accounted for. To help minimize the amount of $NH_3$ slip being released to the atmosphere, AMOX device 38 may be located downstream of SCR 36. A substrate (not shown) of AMOX device 38 may include an oxidation catalyst that oxidizes residual $NH_3$ in the exhaust. In exemplary embodiments, the catalyst materials present on the substrate of AMOX device 38 may be substantially similar to the catalyst materials described above with regard to DOC 33.

Low-pressure accumulator 24 may embody a pressure vessel configured to store pressurized natural gas for future use by regeneration device 29 during active regeneration of DPF 34. Pressurized natural gas may be directed into low-pressure accumulator 28 by pressure regulator 18 via vent passage 52. Alternatively, as described above, pressurized natural gas may be directed into low-pressure accumulator 28 by metering valve 26 of GFSC 12 and/or one or more like valves fluidly connected to passage 30. As noted above, such pressurized natural gas may be vented to low-pressure accumulator 24 in order to, for example, maintain the pressure difference between GFSC 12 and LFSC 14 within a desired range. For example, pressure regulator 18 may vent pressurized natural gas from GFSC 12 to low-pressure accumulator 28 in response to the pressure difference between GFSC 12 and LFSC 14 being less than or equal to a desired pressure difference threshold.

Pressurized natural gas may also be directed into low-pressure accumulator 28 from high-pressure accumulator 24 via accumulator passage 54 and/or one or more metering valves 26 fluidly connected thereto. Such pressurized natural gas may be directed from high-pressure accumulator 24 to low-pressure accumulator 28 in order to, for example, maintain a pressure of low-pressure accumulator 28 within a desired range. For example, metering valve 26 fluidly connected to accumulator passage 54 may direct pressurized natural gas from high-pressure accumulator 24 to low-pressure accumulator 28 in response to a pressure of low-pressure accumulator 28 being less than or equal to a desired low-pressure accumulator pressure threshold. In such embodiments, the low-pressure accumulator pressure threshold may comprise a pressure associated with an amount of pressurized natural gas required to actively regenerate DPF 34 using regeneration device 29.

Because the natural gas disposed within low-pressure accumulator 28 is compressible, it may act like a spring and compress as more natural gas flows into low-pressure accumulator 28. It is contemplated that low-pressure accumulator 28 may alternatively embody a membrane/spring-biased or bladder-type accumulator, if desired. Low-pressure accumulator 28 may be configured to store compressed natural gas at relatively low pressures as compared to high-pressure accumulator 24. For example, low-pressure accumulator 28 may be configured to accumulate natural gas having a pressure in the range of about 1-25 MPa. It is contemplated, however, that other pressures may alternatively be accommodated by low-pressure accumulator 28 if desired. For example, in additional embodiments, low-pressure accumulator 28 may be configured to accommodate natural gas having a pressure in the range of about 15-40 MPa. It is also contemplated that low-pressure accumulator 28 may have any desired volume configured to accommodate sufficient compressed natural gas required for multiple active regenerations of DPF 34 using regeneration device 29. During operation of aftertreatment system 15, the pressure within low-pressure accumulator 28 may be monitored and/or regulated. For example, one or more pressure sensors 46 may be associated with low-pressure accumulator 28 and configured to generate signals indicative of the pressure thereof. The signals from pressure sensors 46 may be directed to controller 48 for further processing. Although not explicitly illustrated in FIG. 1, it is contemplated that one or more such sensors 46 may also be associated with additional components of aftertreatment system 15 and/or with passages 50, 52, 54.

Flow controller 56 may comprise an assembly of components that function together to direct fuel to regeneration device 29 for combustion. In particular, flow controller 56 may be configured to regulate a flow of pressurized natural gas from low-pressure accumulator 28 to regeneration device 29 for active regeneration of DPF 34.

Flow controller 56 may be structurally similar to pressure regulator 18, and may include, among other things, a body having a primary cavity and/or a secondary cavity formed therein. The primary cavity of flow controller 56 may be configured to selectively pass a flow of natural gas from a first inlet port of flow controller 56 to an outlet port thereof. The first inlet port of flow controller 56 may be fluidly connected to low-pressure accumulator 28 via a passage 60, and the outlet port of flow controller 56 may be fluidly connected to regeneration device 29 via a passage 62. In exemplary embodiments, the secondary cavity of flow controller 56 may be configured to selectively pass a flow of supplemental fuel from a second inlet port of flow controller 56 to the outlet port discussed above and/or to a separate output port of flow controller 56. For example, the second inlet port of flow controller 56 may be fluidly connected to a supplemental fuel supply 58 via a passage 64, and the secondary cavity of flow controller 56 may be configured to selectively pass a flow of supplemental fuel from the second inlet to the outlet port of flow controller 56 or to the separate output port. Supplemental fuel supply 58 may comprise a tank, accumulator, and/or other like device configured to store combustible fuel at elevated pressures. In exemplary embodiments, supplemental fuel supply 58 may comprise and/or be selectively fluidly connected to the supply described above with respect to LFSC 14. Alternatively, supplemental fuel supply 58 may comprise and/or be selectively fluidly connected to supply 20, and/or other components of GFSC 12. Accordingly, supplemental fuel supply 58 may be configured to supply supplemental diesel or natural gas to flow controller 56, and fuel supplied by supplemental fuel supply 58 may be in liquid or gaseous form, as desired.

One or more controllable valve elements may be associated with flow controller 56. For example, one or more such valve elements may be disposed within the primary and/or secondary cavities of flow controller 56, respectively, and such valve elements may be configured to regulate flow entering and/or exiting the respective cavities. For example, similar to the valve elements described above with respect to pressure regulator 18, the valve elements of flow controller 56 may comprise variable flow control valves configured to separately regulate the pressure and/or flow rate of the respective fluids (e.g., liquid diesel fuel and gaseous natural gas) passing through flow controller 56. Such valve elements may assist in regulating the flow of fuel directed to regeneration device 29 during regeneration of DPF 34, and such valve elements and/or other components of flow controller 56 may be operably connected to controller 48.

Controller 48 may embody a single microprocessor or multiple microprocessors that include components for controlling metering valves 26, pressure regulator 18, injector 16, regeneration device 29, flow controller 56, power source 11, and/or other components of fuel system 10 and/or aftertreatment system 15. Numerous commercially available microprocessors can be configured to perform the functions of controller 48. It should be appreciated that controller 48 could readily be embodied in a general machine microprocessor capable of controlling numerous machine functions. Controller 48 may include a memory, a secondary storage device, a processor, and any other components for running an application. Various other circuits may be associated with controller 48 such as power supply circuitry, signal conditioning circuitry, solenoid driver circuitry, and other types of circuitry.

Controller 58 may receive operator input and/or requests associated with a desired operation of power source 11 by way of one or more operator interface devices (not shown) that are located within an operator station of a machine to which power source 11 is connected. Operator interface devices may embody, for example, single or multi-axis joysticks, levers, pedals, buttons, or other known interface devices located proximate an onboard operator seat (if such a machine is directly controlled by an onboard operator) or located within a remote station off-board of such a machine. Each operator interface device may be a proportional-type device that is movable through a range from a neutral position to a maximum displaced position. Such movement may generate a corresponding position and/or displacement signal that is indicative of a desired machine movement. In addition, a rate of movement (i.e., a position change rate) of operator interface device may be indicative of a desired velocity of machine movement such as, for example, machine acceleration or deceleration. Controller 48 may be configured to operate power source 11 and/or components of fuel system 10 in response to such signals. For example, signals received from operator interface device may indicate a desired acceleration or deceleration of the machine, and controller 48 may be configured to modify the flow of fuel from GFSC 12 and/or LFSC 14 to pressure regulator 18 in response to such signals.

One or more maps relating the interface device signals, the corresponding desired machine velocities, associated fuel flow rates, pressures, and/or flow requests, metering valve positions, pump pressures, speeds, and/or flow rates, modes of operation, operator interface device positions, operator interface device position change rates, and/or other parameters may be stored in the memory of controller 48. Collectively, such parameters may be referred to herein as "operating parameters" associated with the machine and/or fuel system 10, and one or more such operating parameters may be measured, sensed, calculated, and/or otherwise determined by controller 48, pressure sensors 46, and/or one or more additional sensors of the machine in an open-loop or closed-loop manner. Such operating parameters are not limited to those listed above, and additional operating parameters may be known to those having skill in the art. Each of the maps described herein may be in the form of tables, graphs, and/or equations.

INDUSTRIAL APPLICABILITY

The disclosed fuel system 10 and aftertreatment system 15 find potential application in any dual-fuel power generation application. The disclosed fuel system 10 and aftertreatment system 15 may help provide for responsive simultaneous control over diesel and natural gas pressures. For example, by selectively venting natural gas from GFSC 12 to low-pressure accumulator 28 of aftertreatment system 15, the disclosed fuel system 10 may substantially eliminate the risk of pressures within GFSC 12 exceeding pressures within LFSC 14. By controlling the relative pressures of these two fuel circuits in this way, the disclosed fuel system 10 prevents migration of gaseous natural gas into LFSC 14. It is understood that such migration may, over time, damage various components of LFSC 14 and is generally undesirable in dual fuel power system applications.

Additionally, since the vented natural gas is captured and stored in low-pressure accumulator 28, such stored natural gas can be used to assist in future regeneration of DPF 34. As a result, aftertreatment system 15 and fuel system 10 eliminate the harm to the environment caused by releasing such vented natural gas directly to the atmosphere. Moreover, utilizing the vented natural gas to facilitate the regeneration process harnesses a valuable resource that would otherwise be lost if such vented natural gas was released to the atmosphere. Operation of fuel system 10 and aftertreatment system 15 will now be described.

Referring to FIG. 1, operation of fuel system 10 may begin with the drawing of LNG and diesel from the respective supplies. For example, LNG may be drawn from supply 20 by pump 22. Within GFSC 12, the LNG drawn by pump 22 may be heated by heat exchanger 23, and the increase in temperature occurring at heat exchanger 23 may cause the LNG to change phase from liquid to gaseous form. This heated gaseous natural gas may be directed into high-pressure accumulator 24, passed through metering valve 26 disposed in passage 30, and directed into pressure regulator 18. This natural gas may be selectively directed from pressure regulator 18 into injector 16 in response to, for example, one or more control signals from controller 48. Within LFSC 14, the diesel may be drawn from a diesel supply by a pump, and the pump may direct pressurized diesel into an accumulator of LFSC 14. The accumulator may then feed diesel through metering valve 26 disposed in passage 32 and into pressure regulator 18. Diesel may be selectively directed from pressure regulator 18 into injector 16 in response to, for example, one or more control signals from controller 48. Gaseous natural gas and liquid diesel may be substantially simultaneously injected into a combustion chamber of power source 11 by injector 16, and such injection may be varied, increased, decreased, and/or otherwise controlled by controller 48 in a closed-loop manner. In such closed-loop control, controller 48 may direct operation of, for example, injector 16 and pressure regulator 18, as well as the various pumps and/or other components of GFSC 12 and LFSC 14, in response to signals received from pressure sensors 46 and/or other like sensors of fuel system 10. Additionally, controller 48 may regulate injection of natural gas into power source 11 to satisfy fueling demands associated with operation of power source 11. Such demands may correspond to, for example, inputs received from a machine operator via one or more of the operator interface devices described herein. Once directed to power source 11, the natural gas and diesel may be combusted within the combustion chamber, and combustion exhaust may be directed from power source 11 through the various components of aftertreatment system 15 via exhaust passage 50. For example, combustion exhaust may be directed through DPF 34, and particulates may be removed from the exhaust by a substrate of the DPF 34 as the exhaust passes therethrough.

It is understood that during operation, the natural gas pressure within fuel system 10 may be adjusted in different ways upstream of pressure regulator 18. For example, the operation of pump 22 may be adjusted (e.g., the displacement and/or speed of pumping device 42 and/or drive 44 may be adjusted) to thereby vary a pressure and/or flow rate of natural gas being discharged into high-pressure accumulator 24. In addition or alternatively, a restriction placed on the natural gas flow between high-pressure accumulator 24 and pressure regulator 18 may be varied by metering valve 26. By placing a higher restriction on the flow of natural gas between high-pressure accumulator 24 and pressure regulator 18, a greater pressure drop between high-pressure accumulator 24 and pressure regulator 18 may be achieved. The opposite may also be true, and such control may be facilitated by controller 48 via feedback from the various pressure sensors 46. The diesel pressure within LFSC 14 upstream of pressure regulator 18 may also be adjusted in the same way.

During normal operations, diesel pressure within LFSC 14 may always be somewhat higher than natural gas pressure within GFSC 12. However, during operations in which, for example, fuel demand is suddenly reduced, such as after cresting the peak of an incline and beginning to coast, the sensitivity (i.e., the response time) of GFSC 12 and LFSC 14 to such changing conditions may differ. For example, in response to a relatively abrupt reduction in fuel demand, LFSC 14 may be configured to decrease the amount of diesel supplied to pressure regulator 18 more quickly than GFSC 12 may be able to affect a corresponding reduction in the amount of natural gas supplied to pressure regulator 18. This difference in response time may be a function of physical differences between the fuels being supplied to pressure regulator 18. For example, liquid diesel fuel may be substantially incompressible, and accordingly, LFSC 14 may be configured to substantially instantaneously reduce the amount of diesel supplied to pressure regulator 18 in response to a sudden decrease in fuel demand. Gaseous natural gas, on the other hand, is a compressible fluid. As a result, GFSC 12 may have a relatively slower response to such a sudden decrease in fuel demand.

During such operations, controller 48 may be configured to regulate and/or otherwise control pressure differences between GFSC 12 and LFSC 14, and may be configured to maintain a pressure within LFSC 14 greater than or equal to a corresponding pressure within GFSC 12. By controlling the pressure difference between GFSC 12 and LFSC 14 in this way, natural gas from GFSC 12 may be prohibited from migrating to LFSC 14 during operation, and in particular, during sudden decreases in fuel demand.

Figure 2:
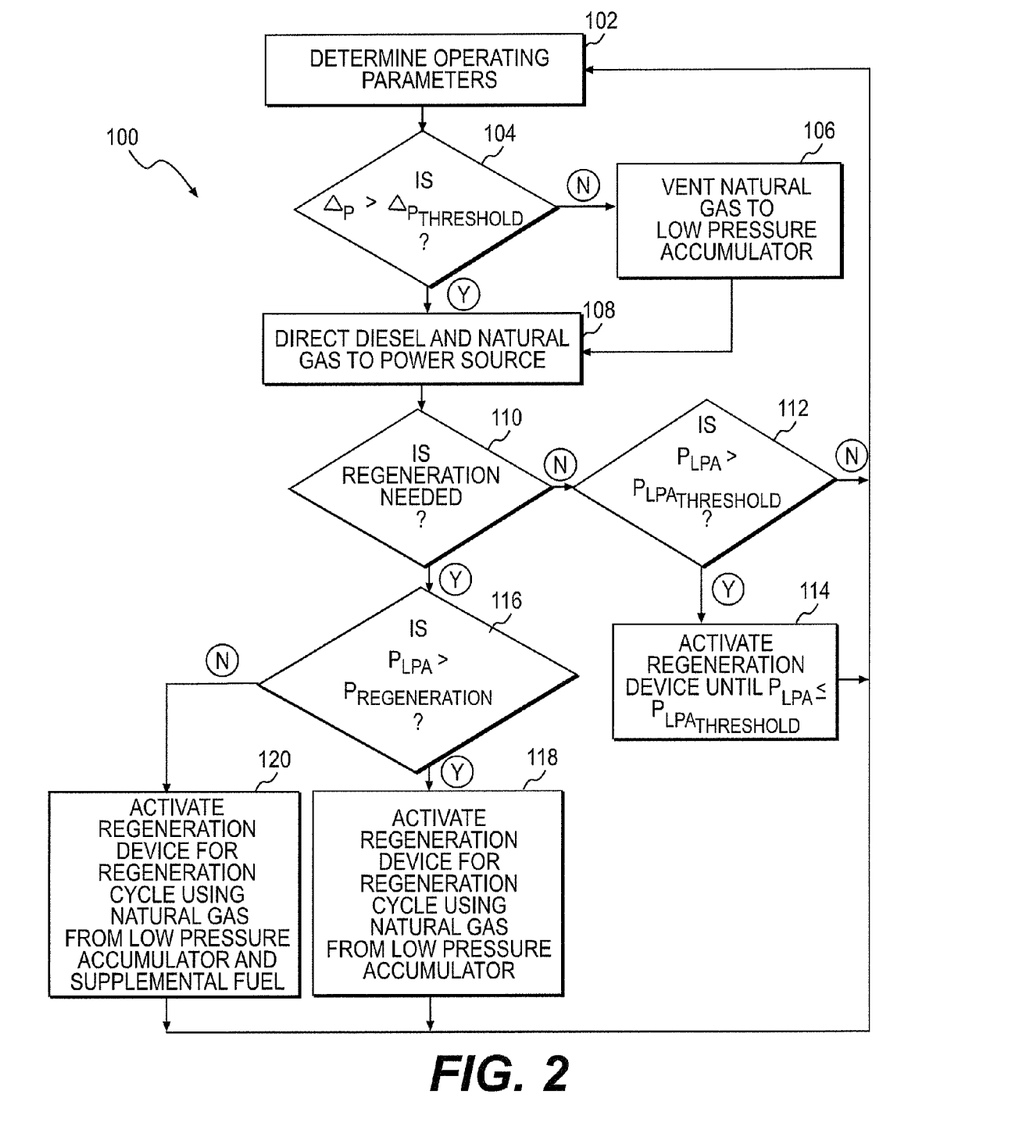
FIG. 2 is a flow chart illustrating an exemplary method of operating the fuel system shown in FIG. 1.

For example, as shown in the flowchart 100 illustrated in FIG. 2, during an exemplary method of operating fuel system 10, pressure sensors 46 and/or other like sensors of fuel system 10 may determine one or more operating parameters associated with fuel system 10, power source 11, and/or aftertreatment system 15 (Step: 102). As described above, such operating parameters may include, for example, desired machine velocities, associated fuel flow rates, fuel pressures and/or flow requests, metering valve positions, pump pressures, speeds, and/or flow rates, modes of operation, operator interface device positions, and/or operator interface device position change rates. In particular, such operating parameters may include a pressure of GFSC 12 and a pressure of LFSC 14. Such pressures may be measured by respective pressure sensors 46 disposed anywhere within GFSC 12 and LFSC 14, and such pressures may comprise, for example, a fluid pressure of passage 30 and a fluid pressure of passage 32, respectively. In such an exemplary embodiment, the fluid pressures may be measured upstream and/or downstream of the metering valves 26 disposed in the respective passages 30, 32.

At Step: 104, controller 48 may determine if a pressure difference (illustrated as "$\Delta_P$" in FIG. 2) between GFSC 12 and LFSC 14 is greater than a pressure difference threshold (illustrated as "$\Delta_{PThreshold}$" in FIG. 2). Since during normal operations, the pressure of LFSC 14 may be somewhat higher than the pressure of GFSC 12, the pressure difference determined at Step: 104 may typically be positive. However, as fuel demand decreases, the pressure of LFSC 14 may decrease more rapidly than the pressure of GFSC 12. Accordingly, the value of the pressure difference threshold employed at Step: 104 may be relatively low, but greater than zero. Although any desired pressure difference threshold may be used by controller 48 at Step: 104, in exemplary embodiments, the pressure difference threshold may have a value between approximately 1 MPa and approximately 10 MPa.

If controller 48 determines that the pressure difference between GFSC 12 and LFSC 14 is less than or equal to the pressure difference threshold (Step: 104—No), controller 48 may, in response, direct pressure regulator 18 to vent natural gas from GFSC 12 to low-pressure accumulator 28 (Step: 106). Such natural gas may be vented, in gaseous form, from pressure regulator 18 to low-pressure accumulator 28 via vent passage 52. Alternatively, such natural gas may be vented, in gaseous form, from metering valve 26 and/or one or more like valves disposed in passage 30 upstream of pressure regulator 18. In this manner, natural gas pressure may be adjusted without having to vent natural gas to the atmosphere. Additionally, as will be discussed below, natural gas stored in low-pressure accumulator 28 may assist in regenerating DPF 34 instead of being released to atmosphere unused. It is understood that at Step: 106, such natural gas may be vented from GFSC 12 to low-pressure accumulator 28, in a closed-loop manner, until controller 48 determines that the pressure difference between GFSC 12 and LFSC 14 is greater than the pressure difference threshold. Additionally, during and/or after the venting of natural gas at Step: 106, control may proceed to Step: 108 where diesel and natural gas may be directed to power source 11, via pressure regulator 18 and injector 16, for combustion.

If, on the other hand, controller 48 determines that the pressure difference between GFSC 12 and LFSC 14 is greater than the pressure difference threshold (Step: 104—Yes), control may proceed to Step: 108 where, as described above, diesel and natural gas may be directed to power source 11, via pressure regulator 18 and injector 16, for combustion.

At Step: 110, controller 48 may determine whether regeneration of DPF 34 is needed. Such a determination may be made by, for example, comparing a measured and/or calculated pressure drop across DPF 34 to a maximum pressure drop threshold. If the measured and/or calculated pressure drop across DPF 34 exceeds the maximum pressure drop threshold, controller 48 may determine that the substrate of DPF 34 is substantially filled with particulates and that, accordingly, active regeneration of the DPF 34 is required. Although not shown in FIG. 1, it is understood that such a pressure drop may be measured using pressure sensors 46 fluidly connected to exhaust passage 50 upstream and downstream of DPF 34. Alternatively, one or more virtual sensors may be utilized by controller 48 to calculate and/or otherwise determine such a pressure drop.

With continued reference to FIG. 2, if controller 48 determines that regeneration of DPF 34 is not needed (Step: 110—No), control may proceed to Step: 112 where controller 48 may determine whether a pressure of low-pressure accumulator 28 (illustrated as "$P_{LPA}$" in FIG. 2) is greater than a low-pressure accumulator threshold (illustrated as "$P_{LPAThreshold}$" in FIG. 2). Step: 112 may embody a system check whereby the volume of natural gas stored within low-pressure accumulator 28 is regulated to avoid filling low-pressure accumulator 28 beyond an acceptable capacity thereof. For example, the low-pressure accumulator threshold may comprise a maximum desired pressure associated with low-pressure accumulator 28. Such a threshold may depend upon the size and/or configuration of low-pressure accumulator 28, and may be a pressure between, for example, approximately 1 MPa and approximately 5 MPa. Further, it is understood that the pressure of low-pressure accumulator 28 may be measured and/or otherwise determined using pressure sensor 46 associated therewith, and that pressure sensor 46 may direct signals to controller 48 indicative of such pressure. If controller 48 determines that the pressure of low-pressure accumulator 28 is less than or equal to the low-pressure accumulator threshold (Step: 112—No), control may return to Step: 102 in a closed-loop manner.

If, on the other hand, controller 48 determines that the pressure of low-pressure accumulator 28 is greater than the low-pressure accumulator threshold (Step: 112—Yes), control may proceed to Step: 114 where controller 48 may activate regeneration device 29 to combust natural gas stored within low-pressure accumulator 28 until the pressure of low-pressure accumulator 28 is less than or equal to the low-pressure accumulator threshold. For example, at Step: 114, controller 48 may direct low-pressure accumulator 28, flow controller 56, and/or other flow control components of aftertreatment system 15 to direct stored natural gas from low-pressure accumulator 28 to regeneration device 29 for combustion therein even though controller 48 determined, at Step: 110, that regeneration of DPF 34 was not needed. Combusting such natural gas at Step: 114 may be beneficial in that such combustion may at least partially combust particulates located in DPF 34 while, at the same time, increasing the available capacity of low-pressure accumulator 28 to store additional vented natural gas. Control may proceed from Step: 114 to Step: 102 in a closed-loop manner.

With continued reference to Step: 110, if controller 48 determines that regeneration of DPF 34 is needed (Step: 110—Yes), control may proceed to Step: 116 where controller 48 may determine whether the pressure of low-pressure accumulator 28 is greater than a regeneration pressure threshold (illustrated as "$P_{Regeneration}$"). The determinations made by controller 48 at Step: 116 may be substantially similar to those made at Step: 112. However, the regeneration pressure threshold referenced at Step: 116 may be a minimum acceptable pressure of low-pressure accumulator 28. In exemplary embodiments, the regeneration pressure threshold of low-pressure accumulator 28 may correspond to a minimum quantity of stored natural gas sufficient for completion of a regeneration cycle associated with DPF 34. Such a "regeneration cycle" may be defined as a length of time required for regeneration device 29 to combust substantially all of the particulates disposed within DPF 34. In such an exemplary embodiment, the regeneration cycle may comprise a finite length of time, such as any time between approximately 5 minutes and approximately 10 minutes. Alternatively, the regeneration cycle may last as long as necessary to combust substantially all of the particulates disposed within DPF 34. In such alternative embodiments, completion of the regeneration cycle may be determined based on, among other things, a comparison between a measured and/or calculated pressure drop across DPF 34 and the maximum pressure drop threshold described above. Thus, although the value of the regeneration pressure threshold associated with low-pressure accumulator 28 may vary and/or may be dependent upon the length of the regeneration cycle, in exemplary embodiments, such a pressure threshold may be between approximately 10 MPa and approximately 15 MPa.

In response to determining that the pressure of low-pressure accumulator 28 is greater than the regeneration pressure threshold associated with low-pressure accumulator 28 (Step: 116—Yes), control may proceed to Step: 118 where controller 48 may activate regeneration device 29 for a complete regeneration cycle using natural gas stored within low-pressure accumulator 28. Upon completion of the regeneration cycle, control may proceed from Step: 118 to Step: 102 in a closed-loop manner.

If, on the other hand, controller 48 determines that the pressure of low-pressure accumulator 28 is less than or equal to the regeneration pressure threshold associated with low-pressure accumulator 28 (Step: 116—No), control may proceed to Step: 120 where controller 48 may activate regeneration device 29 for a complete regeneration cycle using natural gas stored within low-pressure accumulator 28 as well as supplemental fuel received from one or more components of fuel system 10. For example, at Step: 120 such supplemental fuel may be supplied to low-pressure accumulator 28 and/or to flow controller 56 from supplemental fuel supply 58. As described above, supplemental fuel supply 58 may comprise and/or be selectively fluidly connected to the supply of LFSC 14. Alternatively, supplemental fuel supply 58 may comprise and/or be selectively fluidly connected to supply 20, and/or other components of GFSC 12. In still further exemplary embodiments, such supplemental fuel (i.e., supplemental natural gas) may be supplied to low-pressure accumulator 28 and/or flow controller 56 from high-pressure accumulator 24, such as via accumulator passage 54 and/or other like passages, at Step: 120. Accordingly, supplemental fuel supply 58 may be configured to supply supplemental diesel or natural gas to regeneration device 29 via flow controller 56. Likewise, at Step: 120 high-pressure accumulator 24 may be configured to supply supplemental natural gas to regeneration device 29 via flow controller 56. Regardless of its source, the supplemental fuel supplied at Step: 120 may supplement the natural gas supplied to regeneration device 29 from low-pressure accumulator 28 in situations where there is insufficient natural gas stored within low-pressure accumulator 28 to complete a regeneration cycle. Upon completion of the regeneration cycle, control may proceed from Step: 120 to Step: 102 in a closed-loop manner.

Although not illustrated in FIG. 2, fuel system 10 may also be capable of operation in a diesel-only mode. This mode may be desirable when, for example, the supply of natural gas has been depleted, during startup, or when a failure has occurred within GFSC 12. When any of these situations is detected by controller 48, for example by way of pressure sensors 46, controller 48 may direct metering valve 26 and/or pressure regulator 18 to substantially prohibit natural gas from entering injector 16. Additionally, the pump associated with LFSC 14 may draw in and discharge diesel at an increased rate. Thus, an increased flow of diesel may be directed to pressure regulator 18, and may result in a sufficient supply of chemical energy passing through injector 16 to power source 11 such that little or no natural gas is required. In some situations, the diesel-only mode of operation may be an emergency mode of operation only, intended to provide a "limp home" capability that may not be suitable for normal every day operation.

It will be apparent to those skilled in the art that various modifications and variations can be made to the disclosed fuel system and regulator. Other embodiments will be apparent to those skilled in the art from consideration of the specification and practice of the disclosed fuel system and regulator. It is intended that the specification and examples be considered as exemplary only, with a true scope being indicated by the following claims and their equivalents.

What is claimed is:

1. A fuel system for a dual fuel power source, comprising:
a first fuel circuit fluidly connected to the power source;
a second fuel circuit separate from the first fuel circuit and fluidly connected to the power source; and
a pressure regulator fluidly connected to the first fuel circuit, the pressure regulator configured to vent a first fuel from the first fuel circuit to an aftertreatment system fluidly connected to the power source in response to a pressure difference between the first and second fuel circuits being less than or equal to a pressure difference threshold.

2. The fuel system of claim 1, wherein the aftertreatment system includes an accumulator, the pressure regulator being configured to vent the first fuel to the accumulator in response to the pressure difference between the first and second fuel circuits being less than or equal to the pressure difference threshold.

3. The fuel system of claim 2, wherein the aftertreatment system further includes a regeneration device and a particulate filter configured to condition exhaust received from the power source, the accumulator configured to direct the first fuel to the regeneration device.

4. The fuel system of claim 3, wherein the regeneration device is configured to combust the first fuel in response to a pressure of the accumulator being greater than an accumulator pressure threshold.

5. The fuel system of claim 1, wherein the first fuel circuit is fluidly connected to the power source via a first passage and the second fuel circuit is fluidly connected to the power source via a second passage,
the pressure difference comprising a difference between a fluid pressure of the first passage and a fluid pressure of the second passage.

6. The fuel system of claim 5, wherein the first fuel comprises natural gas and the second fuel comprises diesel, the pressure regulator being configured to maintain the fluid pressure of the second passage greater than the fluid pressure of the first passage.

7. The fuel system of claim 1, wherein the pressure regulator is fluidly connected to the second fuel circuit.

8. The fuel system of claim 1 further including a first accumulator fluidly connected to the first fuel circuit, the first accumulator being configured to store the first fuel and to direct the first fuel to the power source via the pressure regulator.

9. The fuel system of claim 8, wherein the aftertreatment system includes a second accumulator fluidly connected to the first accumulator, the first accumulator being configured to direct the first fuel to the second accumulator in response to a pressure of the second accumulator being less than a second accumulator pressure threshold.

10. The fuel system of claim 1, further including a heat exchanger fluidly connected to the first fuel circuit, the heat exchanger being configured to increase a temperature of the first fuel upstream of the pressure regulator.

11. The fuel system of claim 10, further including a pump fluidly connected to the heat exchanger, the pump being configured to pressurize the first fuel and to direct the pressurized first fuel to the heat exchanger.

12. A fuel system for a dual fuel power source, comprising:
a first fuel circuit configured to supply a first fuel to a pressure regulator fluidly connected to the power source;
a second fuel circuit separate from the first fuel circuit, the second fuel circuit being configured to supply a second fuel, different than the first fuel, to the pressure regulator; and
an injector fluidly connected to the pressure regulator, the injector being configured to inject the first and second fuels into a combustion chamber of the power source, wherein
the pressure regulator is fluidly connected to an accumulator and configured to vent the first fuel, in gaseous form, to the accumulator in response to a pressure difference between the first and second fuel circuits being less than or equal to a pressure difference threshold.

13. The fuel system of claim 12, wherein the pressure regulator is configured to direct the first and second fuels to the power source, via the injector, in response to the pressure difference being greater than the pressure difference threshold.

14. The fuel system of claim 13, further including a heat exchanger fluidly connected to the first fuel circuit upstream of the pressure regulator, the heat exchanger being configured to change a phase of the first fuel from liquid to gas.

15. The fuel system of claim 14, further including an additional accumulator, the additional accumulator being fluidly connected to the heat exchanger and configured to store the first fuel, in gaseous form, upstream of the pressure regulator.

16. The fuel system of claim 15, wherein the additional accumulator is fluidly connected to the accumulator and configured to direct the first fuel to the accumulator, in gaseous form, in response to a pressure of the accumulator being less than an accumulator pressure threshold.

17. The fuel system of claim 12, wherein the power source is fluidly connected to a particulate filter and a regeneration device is fluidly connected to the particulate filter, the accumulator being configured to direct the first fuel to the regeneration device for combustion therein.

18. A method of operating a fuel system associated with a dual fuel power source, comprising:
   directing a first fuel, in gaseous form, from a first fuel circuit to the power source;
   directing a second fuel, different than the first fuel, from a second fuel circuit to the power source for combustion with the first fuel;
   directing combustion exhaust from the power source through a particulate filter of an aftertreatment system fluidly connected to the power source;
   venting the first fuel from the first fuel circuit to the aftertreatment system in response to a pressure difference between the first and second fuel circuits being less than or equal to a pressure difference threshold; and
   combusting the vented first fuel in a regeneration device of the aftertreatment system to actively regenerate the particulate filter.

19. The method of claim 18, further including storing the vented first fuel in an accumulator of the aftertreatment system fluidly connected to the regeneration device, and
   combusting the stored first fuel in the regeneration device in response to a pressure of the accumulator being greater than an accumulator pressure threshold.

20. The method of claim 18, wherein the first fuel comprises natural gas and the second fuel comprises diesel,
   the method further including increasing a temperature of the natural gas in the first fuel circuit, wherein increasing the temperature changes a phase of the natural gas from liquid form to gaseous form, and
   storing the natural gas, in gaseous form, in an accumulator of the first fuel circuit.

* * * * *